June 11, 1957    D. F. CHRISTOFFERSON    2,795,180
ROW MARKER

Filed March 13, 1956    2 Sheets-Sheet 1

INVENTOR
DONALD F. CHRISTOFFERSON
ATTORNEY

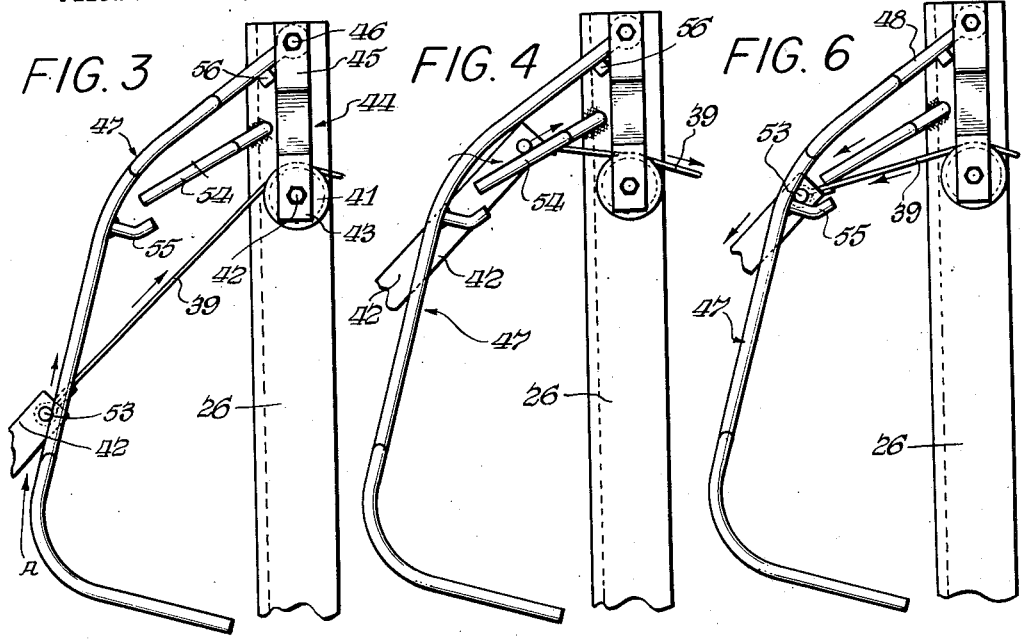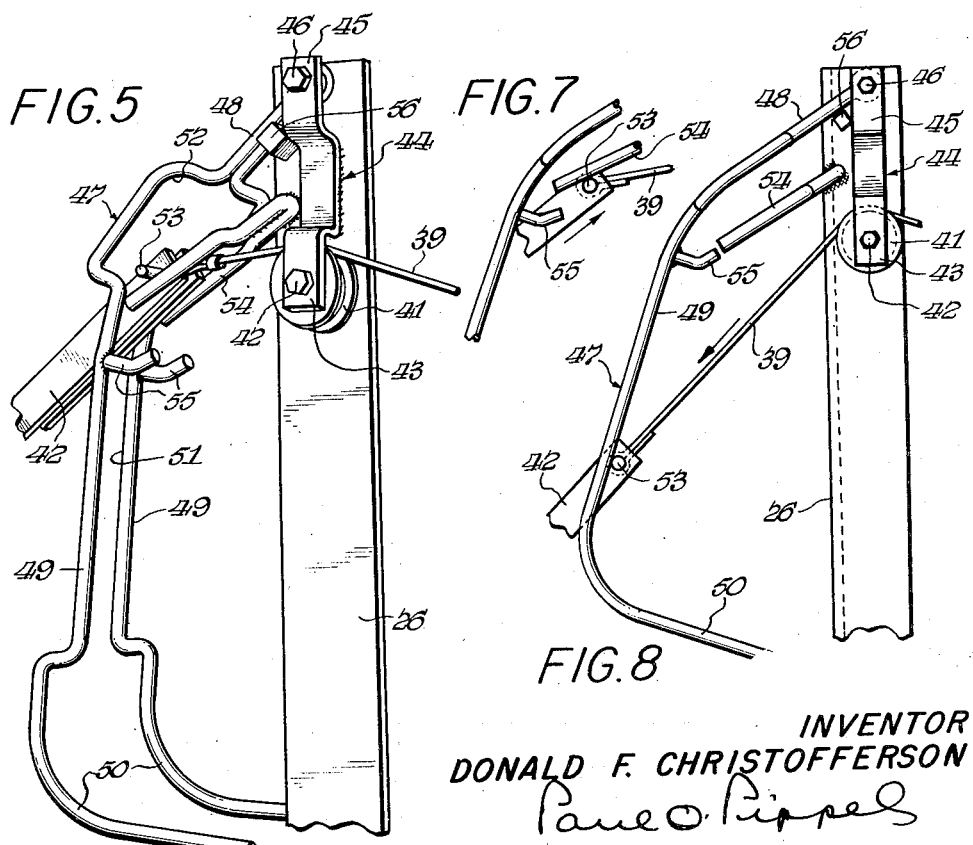

United States Patent Office 2,795,180
Patented June 11, 1957

2,795,180
ROW MARKER

Donald F. Christofferson, Stockton, Calif., assignor to International Harvester Company, a corporation of New Jersey Application March 13, 1956, Serial No. 571,256

18 Claims. (Cl. 97—230)

This invention relates to agricultural implements and particularly to row markers. More specifically the invention concerns a row marker attachment for a tractor which can be used in connection with planter units, cultivators and the like.

It is customary with implements such as certain cultivators and planters to provide a pair of row markers which project laterally from the tractor and score the earth to guide subsequent passes of the implement over the field being worked. Markers on opposite sides of the tractor are used alternately, the inactive marker being held in a transport or raised position while the other marker is operating. When the end of a row is reached and the tractor turns, the implement and marker are raised until the direction of travel is reversed, when the marker in operation is raised to transport and the alternate marker lowered. Usually, both markers are latched in transport position when the turn is made at the end of the field and the tractor operator releases the appropriate latch for one of the markers to drop to operating position. This, of course, necessitates a manual operation apart from the operation of raising the implement. It is highly desirable that this operation of alternately raising and lowering the markers be accomplished automatically as an incident to the rasing and lowering of the earth-working units. Therefore, this invention contemplates as its principal object the provision of an improved control apparatus for a pair of row markers whereby the marker to be placed in operating position is automatically lowered when the implement frame is lowered, while the alternate marker is retained in a transport position.

Another object of the invention is the provision in an implement including a frame adapted to be mounted upon a traveling support and to be bodily raised and lowered by power lift means carried by the support, of a pair of marker arms pivotally mounted on the frame for vertical swinging relative thereto to a raised position as a result of the lifting of the implement frame, wherein means are provided for holding both marker arms in raised position, and means are provided for alternately raising, conditioning one of said arms to return to lowered position when the frame is lowered, while the other said arm is retained in raised position.

Another object of the invention is the provision in an implement attachment for a tractor including a tool frame adapted to be raised and lowered by power lift means on the tractor, of a pair of marker arms swingably mounted on the tool frame at spaced locations for alternate movement between operating and transport positions, wherein the operating marker is lifted when the tool frame is lifted, and when the tool frame is again lowered the previously operating marker is retained in a raised position while the previously transported marker is automatically lowered to operating position.

It is known to provide a pair of positive latches for holding alternately operable marker arms in raised position, and positive release must be provided for these latches.

An additional object of the present invention is the provision in an implement including a pair of alternately operable marker arms which are both raised to transport position when the implement frame is raised, of stop means designed to arrest the downward movement of one of the marker arms, the other arm having been freed during the lifting of the operating marker arms. This is accomplished by providing a stop on the frame for each of the marker arms and a part on each marker arm engageable with its associated stop, guide means being provided effective to condition the operating marker arm to engage the stop when it is lifted to transport position, the part on the other marker arm simply being moved out of cooperative engagement with its associated stop, so that it can be lowered to operating position.

Other objects and advantages of the invention will become clear from the following detailed description when read in conjunction with the accompanying drawings, wherein:

Figure 3 is an enlarged side elevation of a detail showing a part of the implement frame having mounted thereon the guide and retaining means for the left hand marker arm, the cooperating means on the marker arm being shown in engagement with the associated guide means during lifting of the arm;

Figure 4 is a view similar to Figure 3 after the cooperating part on the marker arm has reached a position corresponding approximately to the maximum raised position of the arm;

Figure 5 is an enlarged perspective view similar to Figure 4 showing in greater detail the structure of the guide means;

Figure 6 is a view similar to Figures 3 and 4 showing the cooperating part on the marker arm in cooperative relation with the retaining means after a predetermined lowering of the marker arm from its topmost raised position;

Figures 1, 2:
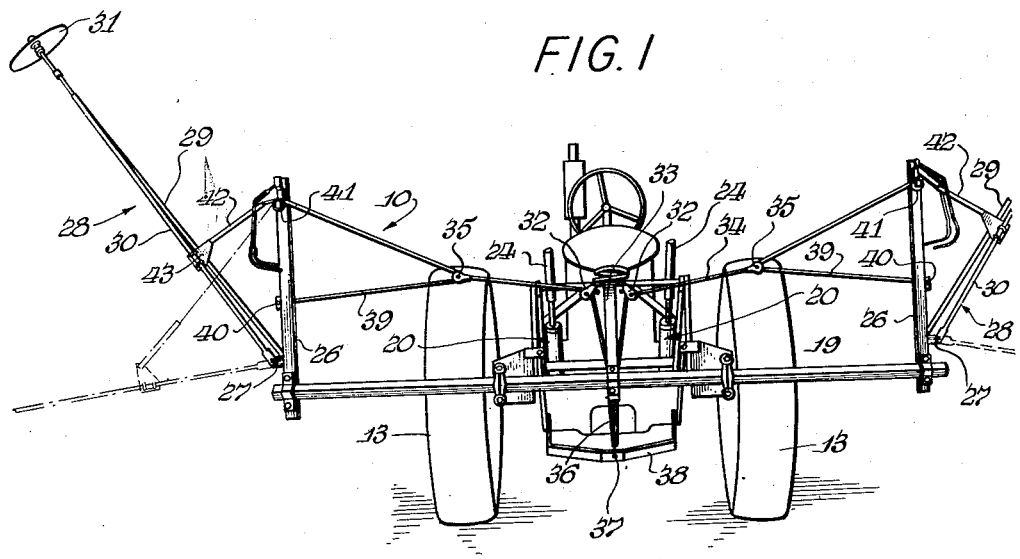
Figure 1 is a rear elevation of a tractor having mounted thereon an implement frame and marker assembly incorporating the features of this invention.
Figure 2 is an enlarged view in side elevation, and partly in section, showing the rear end of a tractor and the manner in which the implement attachment is mounted thereon.

Figure 7 is a fragmentary detail showing the path of travel of the cooperating part on the marker arm when the lift means is again actuated to lift the frame and the marker arms and illustrating the direction of movement of the cooperating part out of cooperative relation with the associated retaining means; and Figure 8 shows another position of the cooperating part as the associated marker arm is lowered to its active or operating position.

Referring to the drawings, it will be observed that the implement attachment of this invention is designated generally by the numeral 10 and is mounted upon the rear of a tractor having a body 11, a rear axle housing 12 and rear drive wheels 13.

The rear axle housing 12 on each side of the tractor body 11 has secured thereto a clamping member 14 to which is affixed an upright bracket 15. Each bracket 15 on opposite sides of the tractor body 11 serves for the pivotal mounting at vertically spaced locations of the forward ends of a pair of vertically spaced parallel links 16 and 17, the rear ends of which are pivotally connected to a standard 18.

Standards 18 have secured thereto a transversely extending elongated tool bar 19, square in cross section, which extends laterally from opposite sides of the tractor and serves as a frame upon which may be mounted suitable earth-working tools, not shown, such as planter or cultivating units. The tool frame 19 is vertically moved between operating and transport positions by lifting apparatus including hydraulic rams 20, each of which comprises a cylinder 21 pivotally anchored at 22 to the lower parallel link 17 near the pivotal connection of the link to bracket 15. A piston rod 23 slidable in cylinder 21 is slidably received in a sleeve member 24, the lower end of which is pivotally connected to upper link 16 near its pivotal connection to standard 18. Fluid is supplied from a source, not shown, on the tractor to cylinder 21 through a hose line 25. Piston rod 23 engages the end of sleeve 24, and extension of the rod swings the links 16 and 17 and the tool frame 19 to a transport position such as indicated in dotted lines in Figure 2.

Secured to each end of the bar 19 is an upright 26 to the lower end of which is affixed a U-shaped bracket 27, to which is pivotally and vertically swingably connected a marker arm generally designated at 28 which comprises a pair of elongated arm members 29 and 30 which converge at their outer ends, arm portion 29 being extended beyond the end of arm 30 and having mounted upon its end an earth scraping disk 31.

As will be noted in Figure 1, marker arms 28 are vertically movable about their pivots on the brackets 27 between the solid line transport position and the operating position indicated in dotted lines. It is a desirable feature that marker arms be raised and lowered as a function of the raising and lowering of the implement frame; that is, when the tractor is turned at the end of a field to reverse its direction of travel, the implement is lifted, and it is desirable that the operating marker arm be likewise lifted and the appropriate marker arm automatically lowered into operating position when the implement frame is lowered. The transmission of lifting force from the implement frame to the marker arms is accomplished by lifting mechanism including a pair of pulleys 32 mounted upon the upper end of a standard 33, the lower end of which is secured to the center of the tool bar 19.

The ends of a flexible cable 34 are passed through the pulleys 32 and have secured to their ends pulleys 35. The center of the cable 34 forms a bight 36 which is anchored at 37 to a U-shaped drawbar 38 secured to the tractor body 11 to provide a relatively stationary anchor for the cable 34.

Another cable section 39 has one end anchored at 40 to the upright 26 medially of its ends, and the other end thereof is passed through the pulley 35, over a pulley wheel 41 on upright 26, and has secured to its end a bar 42, which in turn is pivotally connected to a plate 43 secured to the arm portion 30. The marker arm assemblies 28 at each end of the frame bar 19 are substantial duplicates, as well as the manner in which they are mounted upon the upright 26, and a description of one will suffice for both.

Each of the pulleys 41 is mounted upon a pivot bolt 42 in the offset arm 43 of a bracket 44 affixed to the upper end of the upright 26. At this point it should be clear that when the implement attachment 10 is raised to the transport position indicated in Figure 1, the anchor point of the flexible cable 34 remains stationary while the frame moves and the marker arms 28 are elevated to and retained in the transport position shown in Figure 1.

It has previously been noted that it is customary practice to retain both marker arms in a transport position until the tractor is turned at the end of a field and the implement attachment is again lowered for traversing a field in the opposite direction. In this case it is desirable that the alternate marker be lowered to its operating position automatically without the necessity for a manual operation on the part of the tractor operator. In order to accomplish this, the applicant has provided novel latching or retaining means for assuring that one marker arm will be held in its transport position while the other marker arm is released from its transport position so that it may be lowered with the earth-working tools to an operating position.

Bracket 44 is provided with another offset arm 45 carrying a pivot bolt 46 upon which is swingably mounted a conditioning means in the form of a combination guide and retaining member 47 which is generally fork-shaped, and has a head portion 48 mounted upon the pivot bolt 46, and is formed of a pair of spaced rod-like members 49 widened at the lower end thereof to provide inwardly curved tines 50, a central elongated narrow groove portion 51 and a broadened opening 52 near its upper end.

Referring particularly to Figures 3 to 8, we will assume the tractor is at the end of the field and the implement is being raised to transport position preparatory to turning. In the figures referred to the operation of the left hand marker arm is illustrated and a part 53 in the form of a pin extending through and projecting laterally from opposite sides of the two bars forming the member 42 serves as an anchor for the end of cable section 39. Thus, as the cable section 39 is drawn inwardly in response to lifting of the tool frame, the marker arm 28 swings upwardly and pin 53 engages the outer face of the parts 49 of guide 47 forming the groove 51. The length of pin 53 is such that the pin would fall within the space formed by the tines 50 were it not for the fact that the angle "A" shown in Figure 3 between bar 42 and the parts 49 of the guide 47 causes the pin to engage the guide at a point above the space formed by the tines 50. Therefore, pin 53 rides up the outer face of the guide 47 as shown in Figure 3 until the widened space 52 is encountered, whereupon the pin 53 drops through this space onto a guide member 54 comprising a U-shaped member welded to the upper end of upright 26 and extending at an angle downwardly and outwardly.

In the position of the parts shown in Figures 4 and 5, the marker arm 28 on the left hand side has reached its maximum raised position. When the implement is again lowered, pin 53 on the left hand marker arm 28 follows a path downwardly along the guide member 54 until it is arrested by stops in the form of hooks 55 affixed to and projecting inwardly from the members 49 of the guide.

Stops 55 serve as retainers to hold the pin 53 and prevent the associated marker arm 28 from dropping. While the left hand marker arm 28 is being lifted and the associated pin 53 is following the path along the outside of guide members 49, into the opening 52, dropping upon the slanted guide member 54 and falling to the retainer 55, the pin 53 for the right hand marker arm 28 follows a different path. Since this is the same path followed by pin 53 for the left hand marker arm on the next operation of lifting the implement and the marker arms, the latter operation will be described.

Guide member 47, as pointed out before, swings about the axis of the pivot bolt 46 toward and away from the upright 26, and its movement toward the upright is limited by the provision of a stop 56 welded to the bracket 44. Guide 47 with retainer 55 and inclined member 54 forms a kind of latching mechanism for retaining the marker arm in raised position, and in Figure 6 it will be observed that the position of pin 53 and the angle of cable 39 constrains or conditions the pin, the next time the implement and markers are raised to the maximum lifted position, to follow the path shown in Figure 7 with pin 53 engaging the underside of the member 54. In Figures 7 and 8 the pin has been moved away from retainer 55 so that when the implement frame is lowered and the marker arm falls to its operating position, pin 53 engages the inner surface of the members 49 of the guide until the forked portion formed by the tines 50 is reached, whereupon the pin 53 passes between the tines and outwardly. It will be observed that in the operation of raising the marker arm the pin 53 engaging the outside of guide 47 presses it inwardly against the stop 56, whereas in the lowering operation the pin engages the inside of the guide and the weight of the marker swings the guide away from the stop.

As indicated before, while pin 53 for the left hand marker 28 is following the path which will carry it into cooperative relation with retainer 55, the pin 53 for the right hand marker 28 is constrained to follow a path as previously described out of cooperative engagement with the associated retainer 55, the latter movement of pin 53 being indicated in Figures 7 and 8.

It should be clear from the foregoing that novel apparatus has been described for effecting automatic operation of a pair of marker arms when mounted on an implement such as a planter, cultivator, or the like. It is important when operating implements of this type that both of the marker arms be elevated when the implement is lifted for turning at the end of a field, and the like, so that no part of the implement will drag upon the ground or strike fences and other obstructions when the implement is turned. The present invention requires no independent manual operation whatever for the marker arms, the operation thereof being automatically effected in response to and coincident with the raising and lowering of the implement frame.

The invention has been described in its preferred embodiment only, and it should be clearly understood that modifications may be made in the invention without departing from the spirit thereof or the scope of the appended claims.

What is claimed is:

1. In an agricultural implement, a support, a marker arm pivotally mounted on the support, mechanism serving as lifting means on the support and connected to said marker arm to effect alternate vertical swinging thereof from a lowered or operating to a maximum raised position, a latch part operatively carried by said arm, guide means on the support cooperable with said latch part during raising of said arm to guide said part in a predetermined path to its maximum raised position upon actuation of the lifting means to raise the marker arm, a stop member carried by the support and cooperable with said part upon actuation of the lifting means to lower the marker arm a predetermined distance below said maximum raised position to arrest the lowering of said arm, said latch part on the marker arm being releasable from said stop upon actuation of the lifting means to again raise the marker arm to its maximum position, whereby said arm may be lowered to its operating position.

2. The invention set forth in claim 1, wherein a pair of interconnected marker arms are provided, one of said arms being in the lowered or operating position while the other said arm is in the raised position, said lifting means being effective in the raising operation to simultaneously lift both said arms to their maximum raised positions, and in the lowering operations to alternately arrest one marker arm while lowering the other.

3. The invention set forth in claim 1, wherein said guide means includes a fixed member and a pivoted member swingable away from said fixed member during raising of the marker arm to accommodate passage of said latch part therebetween, and said stop being mounted on said swingable member and cooperable with said fixed member.

4. In an agricultural implement, a traveling support, a tool frame mounted on the support, lift means on the support connected to said tool frame for raising and lowering the latter, a pair of alternately operable marker arms pivotally mounted on the frame, one of said arms being in a lowered or operating position while the other said arm is in a raised position, means connected to said marker arms and responsive to raising of said frame for raising the operating marker arm, comprising a flexible member connected to both said arms for raising one arm, a part on said flexible member, guide means on the frame cooperative with said part during the raising of said one arm to cause the part to follow a predetermined path, a stop on the frame in said path engageable with said part to arrest the marker arm in a raised position, said guide means including means guiding said part in another path away from said stop when said lift means is again actuated to raise the other said marker arm.

5. In an agricultural implement, a traveling support, a tool frame mounted on the support, lift means on the support connected to said tool frame for raising and lowering the latter, a pair of marker arms pivotally mounted on the frame, means actuated by said lift means when raising and lowering said tool frame for correspondingly raising and lowering said marker means, a latch part carried by each of said marker arms, latch members carried by the frame cooperative with said latch parts to hold the marker arms in an inoperative position between lowered and fully raised positions, guide means on the frame associated with each said marker arm and operative upon movement of both of said arms to fully raised position to guide the latch part on one of said arms into operative relation with the associated latch member on the frame, the guide means for the latch part on the other of said arms being effective to guide said latch part out of operative relation with the associated latch member on the frame.

6. In an agricultural implement, a traveling support, a tool frame mounted on the support, lift means on the support connected to said tool frame for raising and lowering the latter, a pair of marker arms pivotally mounted on the frame, means actuated by said lift means when moving said tool frame from lowered to raised position for correspondingly moving said marker arms from lowered to fully raised position, a latch part on each said arm, latch members on the frame cooperative with the respective of said latch parts to hold said arms in an intermediate position between lowered and fully raised positions, guide means on the frame cooperative with said latch parts when moving said arms from lowered to fully raised positions to cause said latch parts to follow one path into cooperative relation with said latch members upon actuation of the lift means to again lower said frame and said marker arms, said guide means being effective upon again actuating the lift means to move said arms to fully raised position to cause said latch parts to follow another path out of cooperative relation with said latch members.

7. In an implement attachment for a tractor having power lift means thereon, a tool frame connected to said lift means for vertical movement between operating and transport positions relative to the tractor, a pair of marker arms pivotally mounted on said frame at laterally spaced locations for swinging between laterally extending operating and generally vertical transport positions, means operatively connected to said marker arms for raising and lowering them by the power of said lift means in response to raising and lowering said tool frame, stop means for each of said arms carried by the frame effective to hold said arms in raised position, said marker arms being alternately operable whereby when one of said arms is in lowered position the other is held in cooperative relationship with its stop in a raised position, conditioning means carried by the frame operative to condition a part of the marker arm in lowered position to follow a path into cooperative relation with its associated stop when the arm is raised and to follow another path out of cooperative relation with said stop when the other said marker arm is raised.

8. The invention set forth in claim 7, wherein said conditioning means comprises guide means carried by the frame and associated with said stop, said part carried by said marker arm engageable with said guide means and adapted to follow a path formed by said guide means to a position in cooperative relation with the associated stop when said lift means is actuated to raise one of said marker arms, said part being conditioned to follow another path out of cooperative relation with said stop when the lift means is again actuated to raise the other said marker arm.

9. The invention set forth in claim 8, wherein said part on the marker arm being raised comes into cooperative relation with the associated stop on the frame after a predetermined lowering movement of said arm from its fully raised position, and said part automatically moves out of cooperative relation with said stop when the lift means is again actuated to raise said marker arms.

10. The invention set forth in claim 7, wherein the means for raising and lowering said marker arms includes pulley means on said implement frame and cable means anchored to a relatively stationary point on the tractor and extending by way of said pulley means to said marker arms, said cable means exerting a pull on said marker arms in response to raising of said implement frame.

11. Control means for a pair of marker arms mounted on a frame and adapted to be alternately moved between a lowered or operating and a raised or nonoperating position, comprising lift means operatively connected to said marker arms for moving them simultaneously to a maximum raised position and for alternately lowering them to operating position, stop means on said frame, a part carried by each said arm cooperable with said stop to hold the associated arm in raised position, and guide means on the frame cooperative with said part, when the arms are raised, to guide one of said parts into cooperative relation with the associated stop and simultaneously guide the other said part out of cooperative relation with the associated stop.

12. Control means for a pair of marker arms mounted on a frame and adapted to be alternately moved between a lowered or operating and a raised or nonoperating position, comprising lift means operatively connected to said marker arms for moving them simultaneously to a maximum raised position and for alternately lowering them to operating position, stop means on said frame, a part carried by each said arm cooperable with said stop to hold the associated arm in raised position, and guide means on the frame cooperative with said part, when the arms are raised, the part on one of said arms being engageable with said guide and constrained to follow one path to a position in cooperative relation with the associated stop, and the part on the other of said arms being constrained to follow a path out of cooperative relation with its associated stop.

13. The invention set forth in claim 11, wherein said marker arms are alternately raised and lowered, the part on the marker arm in raised position being in operative engagement with the associated stop to hold the arm in raised position, and the part on the marker arm in lowered position is constrained by said guide means to follow a path into cooperative engagement with its associated stop while the part on the other said arm is simultaneously guided in a path out of operative engagement with its associated stop.

14. A marker attachment for a tractor comprising a frame movably mounted on the tractor, lift means on the tractor connected to said frame for raising and lowering the latter, a pair of marker arms pivotally mounted on said frame at laterally spaced locations and means for simultaneously disposing said arms in raised position and for automatically lowering alternate marker arms when said frame is lowered, comprising a pair of laterally spaced uprights mounted on the frame, pulleys on said uprights, flexible cable means anchored to the tractor and extending laterally over the pulleys on said uprights, means connecting the outer ends of said cable means to said arms, whereby said cable becomes taut and said arms are raised when said frame is raised, retaining means carried by said uprights, a part carried by each of said arms, and guide means automatically operative when raising the lowered marker arm to guide the associated part into cooperative relation with said retaining means, said guide means for the other said arm being operative to guide the part on said arm out of cooperative relation with the associated retaining means.

15. The invention set forth in claim 14, wherein said guide means includes a swingable member and a stationary member, said stationary member serving, when lifting one arm from a lowered to a raised position to guide the associated part into cooperative relation with the associated retaining means and to simultaneously guide the part on the other marker arm away from said retaining means.

16. The invention set forth in claim 15, wherein both of said marker arms are simultaneously raised to a maximum raised position when the lift means is actuated to lift said frame, and said retaining means is effective to hold said arms in raised position after a predetermined lowering of the frame and therefore of said arms.

17. In an implement having a frame and a pair of marker arms swingably mounted thereon for alternate operation wherein retaining means is provided for holding the inactive marker arm in raised position while the active marker arm is operating, the combination of means carried by each said marker arm cooperative with said retaining means to hold the arm in raised position, and guide means for each said marker arm, effective upon raising the active arm to transport position, to guide the cooperating means thereon into cooperative relation with the associated retaining means while simultaneously guiding the cooperating means on the inactive arm out of cooperative relation with its associated retaining means.

18. The invention set forth in claim 17, wherein said retaining means is integral with said guide means and enters into cooperative relation therewith only after a predetermined lowering of said arms from a maximum raised position.

References Cited in the file of this patent

UNITED STATES PATENTS

| | | |
|---|---|---|
| 2,546,412 | White et al. | Mar. 27, 1951 |
| 2,586,356 | Lewis | Feb. 19, 1952 |
| 2,604,027 | Hansen | July 22, 1952 |
| 2,657,623 | Allen | Nov. 3, 1953 |